(No Model.) 2 Sheets—Sheet 1.

F. ARMSTRONG.
MACHINE FOR SETTING UP BICYCLE WHEELS AND PUTTING ON RUBBER TIRES.

No. 422,689. Patented Mar. 4, 1890.

Witnesses
C. M. Newman,
R. P. Munson.

Inventor
Frank Armstrong
By H. M. Wooster, Atty.

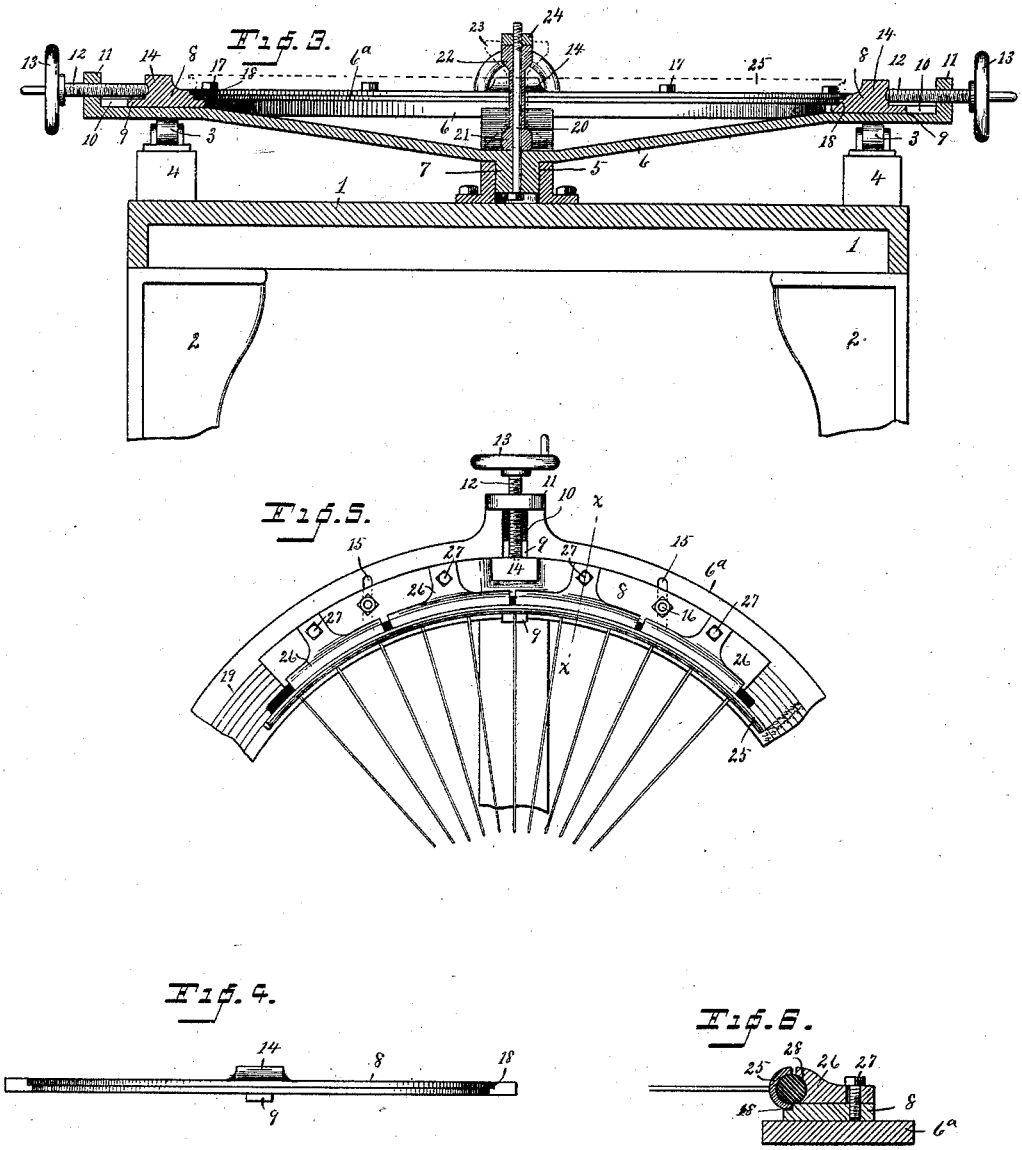

UNITED STATES PATENT OFFICE.

FRANK ARMSTRONG, OF BRIDGEPORT, CONNECTICUT.

MACHINE FOR SETTING UP BICYCLE-WHEELS AND PUTTING ON RUBBER TIRES.

SPECIFICATION forming part of Letters Patent No. 422,689, dated March 4, 1890.

Application filed June 10, 1889. Serial No. 313,643. (No model.)

*To all whom it may concern:*

Be it known that I, FRANK ARMSTRONG, a citizen of the United States, residing at Bridgeport, in the county of Fairfield and State of Connecticut, have invented certain new and useful Improvements in Machines for Setting Up Bicycle-Wheels and Putting on Rubber Tires; and I do hereby declare the following to be a full, clear, and exact description of the invention, such as will enable others skilled in the art to which it appertains to make and use the same.

My invention has for its object to provide a simple, easily-operated, and perfectly-accurate machine for setting up bicycle-wheels and also for putting on the rubber tires. With these ends in view I have devised the simple and novel construction, of which the following description, in connection with the accompanying drawings, is a specification, numbers being used to denote the several parts.

Figure 1:
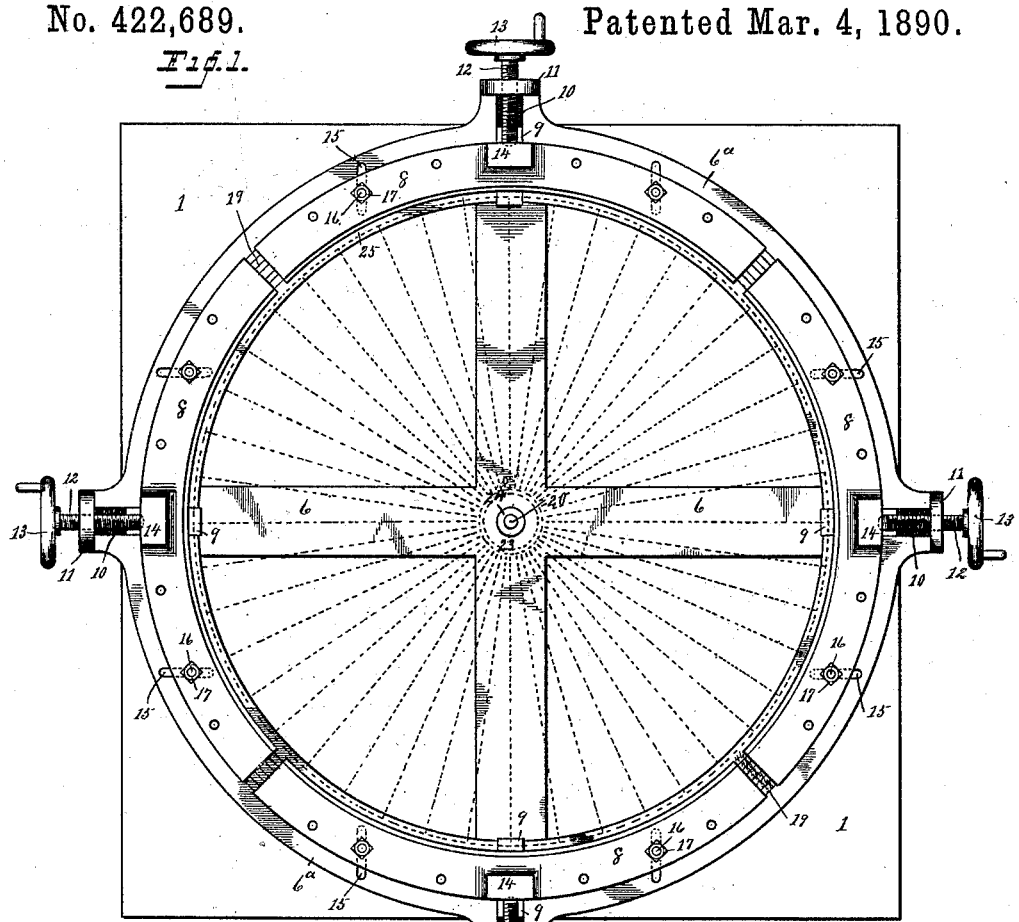
Figure 2:
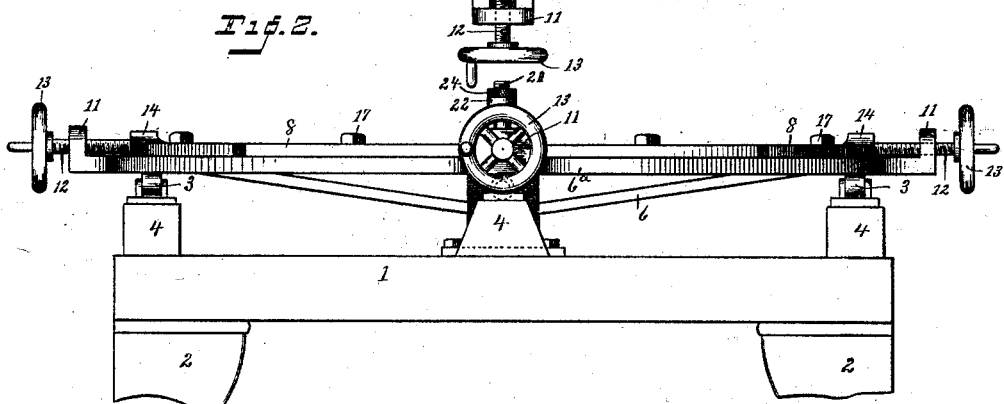

Figure 1 is a plan view of the machine complete; Fig. 2, a side elevation thereof; Fig. 3, a central vertical section; Fig. 4, a face view of one of the segmental plates; Fig. 5, a plan view of a portion of the machine, illustrating the use in connection with the segmental plates of the clamps for putting on the rubber tires; and Fig. 6 is a section, on an enlarged scale, on the line $x\ x$ in Fig. 5.

It is of course well understood that in setting up bicycle-wheels it is necessary to make the wheels as nearly round as possible, and, furthermore, that the rims as manufactured are invariably more or less out of true.

Heretofore, so far as I am aware, the wheels have been trued up by a machine consisting, essentially, of slides having hooks or projections which engage the rim upon the inner side and strain it outward when the slides are moved. This mode of truing up the wheel requires considerable time, as the wheel can only be made perfectly round by a number of tentative movements of the slides. The inner side of the rim, moreover, is frequently quite seriously marred by the hooks or projections. These objections are wholly obviated by the use of my novel machine, which is adapted to all sizes of wheels and forces the rim into perfectly round form by outside pressure before the spokes are attached in place.

1 denotes the bed of the machine; 2, suitable legs by which it is supported; 3, anti-friction rollers carried by blocks 4 upon the bed, and 5 a central socket bolted or otherwise secured to the bed.

6 is a turn-table having a central trunnion 7, which engages socket 5, and the outer edge of which rests upon the anti-friction rollers. For the sake of lightness, while at the same time securing the necessary amount of strength, the turn-table is ordinarily made to consist of an outer circle $6^a$, a central hub $6^b$, which engages the socket, and radial arms $6^c$, extending from the hub to the outer circle. In practice the outer circle, hub, and arms are cast in a single piece.

8 denotes segmental plates, each of which is provided with a guide 9 upon its under side. These guides are placed at the center of the segmental plates and engage corresponding grooves 10 in the turn-table. At the outer ends of these grooves are stumps 11, through which screws 12 pass, each screw being operated by a hand-wheel 13 at its outer end and its inner end bearing against an abutment 14 at the center of each segmental plate—that is, directly above the guide.

15 denotes slots in the turn-table parallel to grooves 10, and 16 bolts passing through holes in the segmental plates and through the slots and provided with nuts, whereby the segmental plates are locked in position after adjustment. At the inner edges of the segmental plates are shoulders 18, which are engaged by the rim of the wheel in setting up, as will be more fully explained.

19 denotes concentric circles upon the turn-table corresponding in diameter with the diameters of the different sizes of wheels to be set up, each circle being suitably marked for convenience in adjusting the segmental plates. It is to be understood that the curvature of the shoulders of these plates corresponds with absolute accuracy with the curvature of a perfectly round wheel of corresponding diameter, a special set of plates being provided for each diameter of wheel.

20 denotes a spindle projecting upward from the trunnion of the turn-table, and 21 and 22 denote, respectively, lower and upper holding-pieces having central openings, through which the spindle passes freely and which are adapted to engage the ends of the hub 23 of a bicycle-wheel, (see dotted lines in Figs. 1 and 3, the hub of the wheel being placed over the lower holding-piece and the upper holding-piece placed over that, said parts being then locked in position by a nut 24, engaging the upper end of the spindle and adapted to be turned down tight upon the upper holding-piece, so as to lock the hub firmly to the turn-table and cause it to rotate therewith.

The operation of setting up a wheel is as follows: The spokes are placed in the hubs in the usual manner, the ends projecting outward radially. The hub is then placed in position over the lower holding-piece and locked there by the upper holding-piece and nut. The rim of the wheel, which I denote by 25, (see dotted lines, Figs. 1 and 3,) is placed upon the turn-table and each of the segmental plates is moved inward until the shoulder thereon registers with the circle on the turn-table corresponding to the diameter of the wheel that is being set up. It will be understood that in practice these segmental plates are pressed in firmly against the rim, so that no matter how badly it may be bent out of shape it must be brought to a perfectly circular form and rigidly locked there by the segmental plates. Should the rim be out of line in the plane of its rotation, it is readily brought to shape in setting up by pressure or by blows of a mallet, the segmental plates acting to hold the rim rigidly in place both in the horizontal and vertical planes of the wheel. Having locked all of the segmental plates in position by tightening nuts 17 on bolts 16, the outer ends of the spokes are now passed through the usual holes in the inner side of the rim and locked there by tightening up nuts in the usual manner.

This style of bicycle-wheels being in comcom use and not being of my invention is not deemed to require description in detail. If the only operation that it is desired to perform upon a wheel is that of setting up, when all of the spokes have been secured in position the hand-wheels are rotated backward, nuts 17 loosened on the bolts, and the segmental plates moved backward to release the rim. The wheel is then removed and a new rim substituted in its place, a new hub with spokes in position being also placed in position at the center of the turn-table. When it is desired to change from one sized wheel to another, it is simply necessary to remove the segmental plates and substitute other plates corresponding to the required diameter of wheel. The putting on of the rubber tire may be performed immediately after the setting up of the wheel, but is ordinarily performed as a separate operation, a number of wheels being first set up and then the tires put on at a second operation.

For the purpose of putting on the rubber tires I attach to the segmental plates a series of clamps 26, held in place by means of screw-bolts 27, which pass through the shanks of the clamps and engage holes in the segmental plates. In the inner face of each clamp is a groove 28, the curvature of which corresponds with the size of the rubber tires that are being put on. These clamps act to hold the rubber tire in place in the rim of the wheel.

The operation of putting on a rubber tire is briefly as follows: The hand-wheels are turned to move the segmental plates with the clamps thereon backward far enough to permit the tire to be laid in cement in the rim of the wheel in the usual manner. The hand-wheels are then turned again to move the segmental plates and clamps forward to the position shown in Figs. 5 and 6, in which position the parts are allowed to remain until the cement by which the tire is secured in place is thoroughly set and hardened. Any number of clamps may be used, it simply being required that the whole of the tire be held firmly in place in the groove of the rim. In Fig. 5 I have shown four clamps upon one segmental plate, that number having been found perfectly convenient in practice. No matter what number is used, but very little space is left between them, so that the tire cannot bulge.

It will be apparent from what has been said that the turn-table rotates freely, the trunnion turning freely in its socket, but most of the weight being upon the anti-friction rollers. The operator stands at any convenient place, and as he fastens the spokes in place in the rim he rotates the turn-table, carrying the wheel with it.

It will of course be understood that the details of construction may be greatly changed without departing from the spirit of my invention.

I claim—

1. A machine for setting up bicycle-wheels, consisting of a table and a series of segmental plates adapted to be moved radially on said table, the inner faces of said plates being arcs of a circle corresponding in diameter with the diameter of the wheel to be set up.

2. A machine for setting up bicycle-wheels, consisting of a table and a series of segmental plates adapted to be moved radially on said table, the inner faces of said plates being arcs of a circle corresponding in diameter with the diameter of the wheel to be set up, and being provided with shoulders adapted to engage the rim of the wheel, whereby the latter is caused to assume a perfectly circular form.

3. A table having concentric circles graduated to correspond with the diameters of wheels, in combination with a series of segmental plates curved to correspond with one of said circles and means, substantially as described and shown, for moving said plates inward and for locking them in position after adjustment.

4. The combination, with the table having grooves 10 and stumps 11, of the segmental plates having guides engaging said grooves, abutments 14, and screws engaging the stumps and bearing against the abutments, whereby the plates are forced inward.

5. The combination, with a table having grooves 10, stumps 11, and slots 15, of segmental plates having guides engaging said grooves, abutments 14, screws engaging the stumps and bearing against the abutments, and bolts passing through the slots and engaging the plates, whereby said plates are locked in position after adjustment.

6. The bed having socket 5 and rollers 3, and a turn-table having a trunnion engaging the socket and resting on the rollers, in combination with segmental plates 8 and means, substantially as described and shown, for moving said plates inward and locking them in position.

7. The combination, with the bed and table, substantially as described and shown, of a central spindle projecting upward from the turn-table, holding-pieces 21 and 22, shaped to correspond with the hub of a bicycle-wheel and passing freely over the spindle, and a nut engaging the top of the spindle, whereby said holding-pieces and a hub may be locked to the table.

8. In a machine of the class described, the combination, with a table, of segmental plates 8, adapted to move radially thereon, means—for example, screws—for forcing said plates inward, and clamps 26, adapted to be secured to said plates for holding a rubber tire in position.

9. In a machine for setting up bicycle-wheels, a turn-table having a central spindle, upper and lower holding-pieces adapted to engage the hub of a wheel, and a nut engaging the spindle to lock the parts in place, in combination with radially-movable segmental plates curved to correspond with the rim of a wheel.

10. In a machine for setting up bicycle-wheels, a turn-table having a central spindle, upper and lower holding-pieces adapted to engage the hub of a wheel, and a nut engaging the spindle to lock the parts in place, in combination with segmental plates curved to correspond with the rim of a wheel and having shoulders to engage the said rim, and clamps 26, adapted to be secured to said plates, as and for the purpose set forth.

In testimony whereof I affix my signature in presence of two witnesses.

FRANK ARMSTRONG.

Witnesses:
A. M. WOOSTER,
ARLEY I. MUNSON.